United States Patent [19]

Lefevre et al.

[11] Patent Number: 5,270,791
[45] Date of Patent: Dec. 14, 1993

[54] FIBRE OPTIC MEASURING DEVICE, RATE GYRO, STABILISATION SYSTEM AND MAGNETIC FIELD OR CURRENT SENSOR

[75] Inventors: Hervé Lefevre, Paris; Philippe Martin, Fresnes; Pascal Simonpietri, Sanit Brice Sous Foret, all of France

[73] Assignee: Photonetics, S.A., France

[21] Appl. No.: 699,332

[22] Filed: May 13, 1991

[30] Foreign Application Priority Data

May 18, 1990 [FR] France .................... 90 06253

[51] Int. Cl.$^5$ ............................. G01C 19/72
[52] U.S. Cl. ........................................ 356/350
[58] Field of Search ...................... 356/350, 345

[56] References Cited

U.S. PATENT DOCUMENTS 4,881,817 11/1989 Kim et al. ................ 356/350
4,882,716 11/1989 Lefevre et al. ............ 356/345

Primary Examiner—Samuel A. Turner
Attorney, Agent, or Firm—Mason, Fenwick & Lawrence

[57] ABSTRACT

The invention relates to a fiber optic measuring device in which the variation in a measured parameter engenders a phase difference between two waves. It comprises a SAGNAC ring interferometer (2) in which two counter-propagating waves propagate; a polarization splitter (6) spatially splits the two polarizations which will propagate in the interferometer (2), interferometer (2) comprises a polarization conserving birefringent fiber (7) having two ends having neutral birefringence axes, each of the ends of the polarization conserving fiber (7) being connected to one of the gates (6b) and (6c) of the polarization splitter (6). It comprises a birefringent component, placed ahead of the polarization splitter (6) and introducing a path difference greater than the coherence length of the source (1) between the two polarized waves.

13 Claims, 3 Drawing Sheets

FIBRE OPTIC MEASURING DEVICE, RATE GYRO, STABILISATION SYSTEM AND MAGNETIC FIELD OR CURRENT SENSOR

FIELD OF THE INVENTION

The invention relates to a fibre optic measuring device enabling measurement of the variation in a parameter which produces non-reciprocal perturbations in a SAGNAC ring interferometer.

The SAGNAC interferometer and the physical phenomena which it involves are well known. In such an interferometer a splitting plate or other splitting device divides an incident wave. The two counter-propagating waves thus created propagate in opposite directions along a closed optical path, recombine and produce interference which depends on the phase shift in the waves when they recombine.

Originally, the closed optical path of SAGNAC interferometers was defined by mirrors. It is now known that it may be constituted by a multi-turn, monomode fibre optic coil.

It is also known that certain physical phenomena are able to produce perturbations, particularly non-reciprocal phase shifts, on counter-propagating waves, engendering a relative phase shift in these waves, which modify their state of interference when they recombine.

The measurement of this relative phase shift enables the phenomenon which engenders it to be quantified.

PRIOR ART

The principal physical phenomenon able to create these non-reciprocal perturbations is the SAGNAC effect produced by the rotation of the interferometer relative to an axis perpendicular to the plane of its closed optical path. The Faraday effect or collinear magneto-optic effect is likewise known to produce non-reciprocal effects of this type; this has for example been described in an article in the journal OPTIC LETTERS (Vol. 7, no. 4, April 1982, pages 180-182) by—K. BOHM. Under certain conditions, other effects can likewise produce a non-reciprocal phase shift.

By contrast, variations in numerous parameters representative of the environment which are often the origin of perturbations in the measurements have only reciprocal effects on the SAGNAC interferometer, do not perturb the relative phase shift between the counter-propagating waves, and hence have no influence on the measurement of the parameter studied. Such is the case for the slow variations of temperature, indices, etc. which modify the optical path traversed by the waves, but modify it in a reciprocal manner.

Much work has been conducted in order to improve the sensitivity and accuracy of the measurements able to be performed with such a measuring apparatus. As regards this topic, it will for example be possible to consult Chapter 9 entitled "Fiber Optic Gyroscope" by Hervpe,acu/e/ C. LEFEVRE, in the work "OPTICAL FIBER SENSORS" Vol. 2, -ARTECH HOUSE-, 1989.

In particular, it has firstly been observed that the response furnished by the SAGNAC interferometer is of the form $P = P_0(1 + \cos \delta\Phi)$ and hence that the sensitivity of this signal in the neighbourhood of the phase difference $\delta\Phi = 0$, is low. It has been proposed to introduce a squared phase difference modulation, with amplitude more or less $\pi/2$ for example, in order to produce the bias setting, that is to say displace the operating point and produce a periodic signal the amplitude of which is a sinusoidal function of the measured parameter, and which can hence be exploited with greater sensitivity and stability.

It was later shown that the accuracy of the measurement is improved by the use of a zero method, also called closed-loop operation. According to this method, an additional so-called negative-feedback phase difference $\delta\Phi_{cr}$ is applied, and serves to compensate for the phase difference $\delta\Phi_p$ produced by the measured parameter. The sum of these two phase differences $\delta\Phi_{cr}$ and $\delta\Phi_p$ is kept null, this enabling the interferometer to be operated with maximum accuracy. The measurement is performed by exploiting the signal necessary for producing the negative-feedback phase difference $\delta\Phi_{cr}$. Thus, the measurement is stable and linear.

The slaving necessary for this closed-loop operation can be performed through a frequency offset. This offset can be generated directly on the basis of acousto-optic modulators, or else simulated by applying a serrodyne modulation to a phase modulator. Such a serrodyne modulation is produced by applying a saw tooth phase modulating ramp. It is also known that a continuous ramp can be replaced by steps synchronised on a clock and that such a signal can be generated on the basis of a logic circuit and a digital-analogue converter.

In the practical embodiments, difficulties have been encountered arising from the optical fibre constituting the ring of the interferometer not being perfect and exhibiting a certain birefringence. This birefringence produces the propagation of two orthogonal modes of polarisation with different speeds. It is known that mode coupling phenomena are then produced which engender non-reciprocal phenomena which are capable of perturbing the measurement.

It is known that these parasitic phenomena can be reduced by using a polariser at the common entrance-exit gate of the interferometer. Since the polariser does not have infinite rejection, it is also known that these effects can be limited by using a highly birefringent polarisation conserving fibre and a wide-spectrum source. The coupled parasitic waves in the orthogonal polarisation lose their coherence with the principal wave because of the birefringence related speed difference, which reduces the effective parasitic signal related to the polarisation conserving defects of the fibre.

However, it has been shown, [see in particular the article "PROGRESS IN OPTICAL FIBER GYROSCOPES USING INTEGRATED OPTICS" BY H. C. LEFEVRE et al., in Proceedings AGARD/NATO, volume CPP-383, pages 9A/1-13, (1985)] that a parasitic signal remains if there are parasitic coupling-points symmetric relative to the coil, that is to say at the same optical distance from the splitter. This is in particular the case for defects in the splitter which divides and recombines the counter-propagating waves. In fact, since this splitter is placed by design at the end of the coil, it generates symmetrical couplings.

It has moreover been proposed (FR-A-2,526,938) to use a singly polarised fibre to produce the coil of the interferometer. The linearly polarised incident wave is split up by a splitting cube which produces the two counter-propagating waves.

These waves, superimposed after circulating in the loop, are extracted, phase shifted by $\pi/2$ relative to 2 one another by a $\lambda/4$ plate in order to carry out the bias 4 setting, then recombined. Measurement of their phase shift allows the magnitude of the rotation (or of the measured parameter) to be obtained.

In this arrangement, the π/2 phase shift introduced by the λ/4 plate cannot be perfectly stable, in particular because of the variation in birefringence with temperature. This introduces a source of movement or source of error in the measurement.

The aim of the invention is to produce a device which avoids the parasitic signals produced by symmetrical couplings, whilst avoiding the disadvantages which may be produced through the introduction of a λ/4 plate.

SUMMARY OF THE INVENTION

For this purpose, a fibre optic measuring device is proposed comprising a linearly polarised light source, a SAGNAC ring interferometer in which two counter-propagating waves propagate, a detector, electronic means comprising a processing system furnishing a signal which is a function of the measured parameter, and means of modulating the phase difference separating the counter-propagating waves.

The incident wave coming from the source is equally distributed over the 2 modes of polarisation of a polarisation splitter so as to spatially split the 2 polarisations which will propagate in the interferometer. The interferometer comprises a polarisation conserving birefringent fibre having two ends having neutral birefringence axes, each of the ends of the polarisation conserving fibre being connected to one of the gates of the polarisation splitter, the axes of each end co-inciding with those of the associated gate so as to couple, at each end, the light in the same mode of polarisation from the birefringent fibre.

According to the invention it comprises a birefringent component placed ahead of the polarisation splitter and introducing a path difference greater than the coherence length of the source between the two polarised waves.

Preferably, the polarisation splitter is an all-fibre polarisation splitter.

In a preferred embodiment the fibre optic measuring device comprises a birefringence modulator placed between the source and the polarisation splitter and whose 2 modes of polarisation correspond to those of the polarisation splitter. The light coming from the source also being distributed over the 2 modes of polarisation of the modulator.

BRIEF DESCRIPTION OF THE DRAWINGS

The invention will be described in more detail with reference to the attached drawings, in which:

FIGS. 4a and 4b are a representation of the fibre optic polarisation splitter capable of being used to implement the invention.

DESCRIPTION OF THE PREFERRED EMBODIMENT

Figure 1:
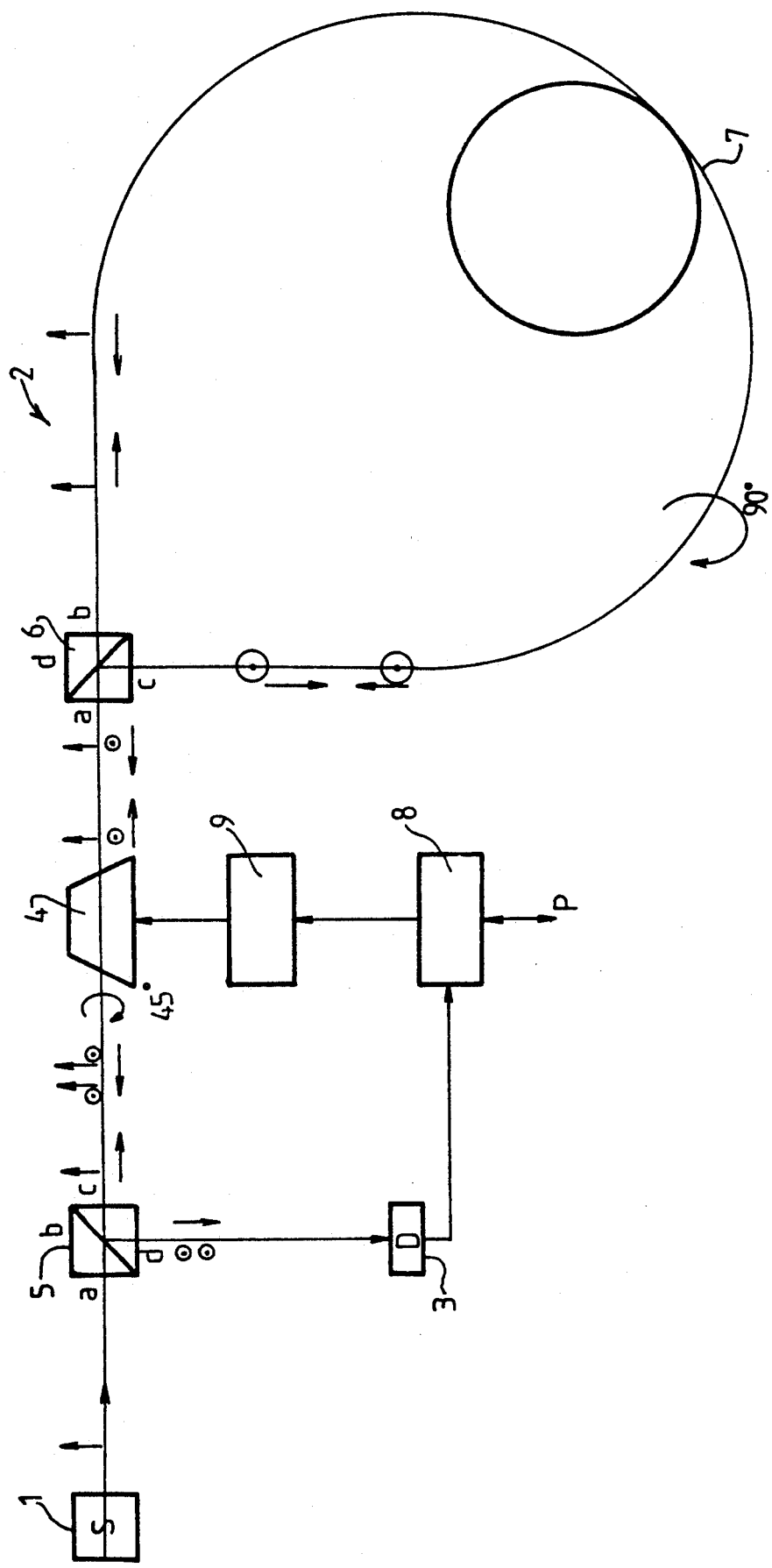
FIG. 1 is a diagram representing the device of the invention in a first embodiment.

The fibre optic measuring device comprises a widespectrum light source 1, a SAGNAC ring inter-ferometer 2, a receiver 3 and a birefringence modulator 4. A polarisation splitter 5, termed the entrance split-ter, allows the signal exiting the interferometer 2 to be extracted so as to direct it towards the detector 3.

A second polarisation splitter 6, termed the loop splitter, allows the fast and slow incident waves to be spatially split into two counter-propagating waves which traverse the ring 7 of the interferometer 2 in opposite directions.

The semi-transparent splitter of counter-propagating waves which is generally present in the devices of the prior art, does not exist here. The polarised entrance wave is conveyed to a birefringent propagation medium in such a way as to balance the power half-and-half in the fast mode and the slow mode for this medium: a polarisation splitter is placed in series. It spatially splits the fast mode and the slow mode, and the 2 exit gates of the polarisation splitter are connected up to the ends of the fibre coil. This coil is preferably a polarisation conserving fibre coil and its ends are oriented in such a way as to optimise the coupling of the same mode of polarisation of the fibre at the two exit gates of the polarisation splitter.

Actual splitting of the counter-propagating waves takes place in effect at the entrance of the birefringent medium. The polarisation conserving defects in the vicinity of the polarisation splitter which spatially divides the counter-propagating waves, are therefore no longer symmetric relative to the actual point of separation. In fact, the path of the slow mode of the birefringent medium is longer than that of the fast mode. The invention therefore enables elimination of the problem usually related to the conserving of polarisation of the semi-transparent splitter of the beam.

The polarisation splitter can be produced from conventional optics (polarisation splitting cube, Wollaston prism, for example) or indeed from monomode guided optics. The article entitled "HIGH SELECTIVITY POLARIZATION SPLITTING FIBER COUPLER" by H. C. LEFEVRE et al., Proceedings SPIE, volume 988, 63–69, (1988), describes in particular an all-fibre polarisation splitter which is well suited to the invention.

Furthermore, in a preferred embodiment, the phase modulator usually placed on the coil is eliminated, thus avoiding discontinuities. It is replaced by a birefringence modulator placed ahead of the polarisation splitter. These birefringence modulators already possess intrinsic birefringence and can therefore also fulfil the role of birefringent propagation medium placed ahead of the polarisation splitter. Preferably, this modulator is an optical component integrated for example on an electrooptic substrate.

The birefringence modulator 4 is crossed by the two counter-propagating waves after their splitting on the outward journey and before their recombining on the return journey. The permanent path difference introduced by this birefringent element and which is due to its intrinsic birefringence, is greater than the coherence length of the source, and preferably several times greater than this coherence length.

The counter-propagating waves are linearly polarised in the same mode of polarisation of the fibre coil.

To retain this state of polarisation, the loop 7 consists of a polarisation retaining fibre. As their name indicates, such fibres ensure the transmission of a polarised light beam whilst conserving its state of polarisation. They are, by design, highly birefringent. This birefringence is generally created through stressing with a specific structure for the cladding (elliptical cladding structure, "PANDA" structure, "bow-tie" structure) etc. They are represented, both at their entrance and at their exit, by neutral birefringence axes indicating the respective directions of their fast axis and of their slow axis.

The loop splitter 6 is a polarisation splitter. Such a splitter comprises a common entrance gate a and two separate exit gates b, c. Each of these gates is represented by its neutral polarisation axes.

An incident light beam, entering through the gate a, is split into two exiting beams, the beam exiting through the gate b being linearly polarised parallel to one of the axes of the gate a, for example the vertical axis, whereas the other, exiting through the gate c, is linearly polarised parallel to the other axis of the gate a, for example its horizontal axis.

A polarisation splitter of this type can constitute a discrete component, for example a polarising cube or a Wollaston prism. It can also consist of an all-fibre polarisation splitting coupler, like that described in the article "HIGH SELECTIVITY POLARIZATION SPLITTING FIBER COUPLER" by H. C. LEFEVRE et al., Proceedings SPIE, Volume 988, 63-69, (1988).

The all-fibre polarisation splitter is produced through lateral polishing of two elements of fibre which is highly birefringent in a direction respectively parallel or perpendicular to the fast propagation axis. These two fibres, supported in grooves formed in silica blocks and being subjected to predetermined bending operations, are associated. It is thus possible to produce a polarisation splitting fibre coupler having the properties indicated above. The ratio of the powers transmitted to one or other of the interfaces can be regulated.

The entrance splitter 5 can advantageously be of the same kind as the loop splitter 6.

The modulator 4 is a birefringence modulator, and it is advantageously an integrated optical component. This component is a phase modulator, the technology of which is known, and can in particular be produced with a straight guide fabricated on a lithium niobate substrate in the X section-Y propagation orientation with electrodes placed on each side of the guide, and the applied electrical voltage modifies the phase of the wave propagating in the modulator. This modification differs according to the direction of the polarisation. A modulating electrical voltage thus introduces a modulation of the phase difference between the modes of polarisation and therefore a modulation of the birefringence.

The electrical signal produced by the detector 3 is supplied to a processing system 8 which, on the one hand, supplies the magnitude of the measured parameter for any desired use and, on the other hand, feeds electronic means 9 which control the modulator 4.

Figure 2:
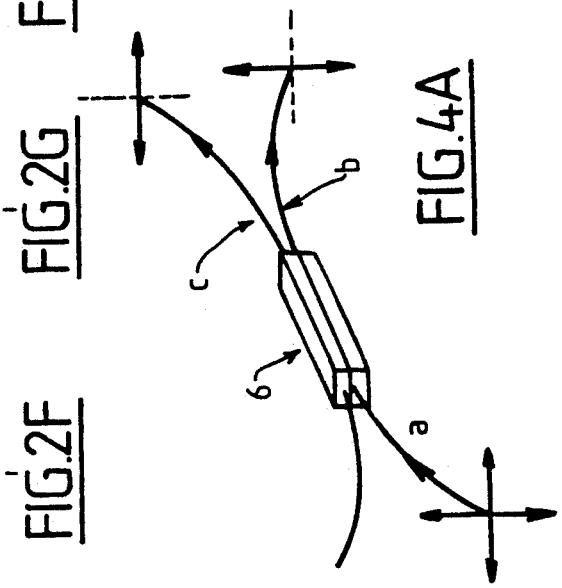
FIGS. 2a-2j represent the states of polarisation of the light after the various components in the embodiment represented in FIG. 1.

The various states of polarisation of the light beam in the course of its propagation in the measuring device will now be explained with reference to FIG. 2.

The light source 1 emits a highly polarised, and temporally weakly coherent beam. It is for example a wide-spectrum superluminescent diode. Its state of polarisation is represented in FIG. 2A.

One of the principal axes of the entrance of the splitter 5 is parallel to the direction of polarisation of the source (FIG. 2B), and it reduces at the exit 5C the residual component of light polarised perpendicular to the direction of polarisation of the principal flux, emitted by the source 1.

The axes of polarisation of the phase modulator 4 are oriented at 45° (FIG. 2C) from those of the exit 5C of the splitter 5. If the device is produced with discrete components, these components are effectively oriented relative to one another. In the case of an "all-fibre" embodiment, the splitter 5 and the birefringence modulator 4 are connected by a polarisation conserving fibre whose axes are subjected to a rotation of 45° (to within $2\pi$) between these two elements. The important function is to distribute equally the incident wave over the 2 modes of polarisation of the birefringence modulator; this can be performed by a rotation of the axes of the modulator, as indicated above, but also with a half-wave or quarter-wave birefringent plate for example.

The axes of polarisation of the entrance gate 6a of the loop splitter (FIG. 2d) are parallel to those of the birefringence modulator 4. This splitter spatially divides the two entrance polarisations. The polarisation exiting through the gate 6b is coupled in one of the 2 modes (for example mode 1) of one of the ends of the fibre coil (FIG. 2E). The polarisation exiting through the gate 6C is coupled in the same mode (for example mode 1), but at the other end of the fibre coil (FIG. 2F). This therefore requires a 90° relative rotation of the neutral axes of the fibre between the two ends in order to use the same mode of polarisation in the 2 directions of the fibre.

After propagation in the same mode, along the coil 7, the two counter-propagating waves return and pass back in the opposite direction in the splitter 6 and the birefringence modulator 4 (FIG. 2G). The polarisation which was in the fast mode on the outward journey is in the slow mode on the return journey, and vice versa. These two polarisations are orthogonal, but they also pass back across the polarisation splitter 5, and at the gates 5a (FIG. 2H) and 5d (FIG. 2J) the 2 waves again have the same polarisation and can therefore interfere.

Thus, the polarised light emitted by the source 1 is filtered by the entrance splitter 5 then split up into two perpendicularly polarised modes of equal intensity, by the modulator 4. This birefringence modulator 4 introduces a phase difference $\delta\Phi$ between its two modes. $\delta\Phi$ is a function of the signal received by the modulator 4 from the electronic means 9. The loop splitter 6 splits these two modes, addressing each of them to one of the ends of the fibre coil 7 and ensuring their rotation in opposite directions inside the ring. Given the 90° rotation of the axes of polarisation of the fibre constituting the ring 7, these two waves are joined together by the loop splitter 6 and re-emerge through the gate a. In the course of their propagation in the ring 7, they have undergone a complementary phase shift $\delta\Phi_p$ due to the measured parameter.

The two waves then cross, on the return journey, the birefringence modulator 4, each then being oriented at 45° relative to the axes of the entrance splitter 5, each of them is split up into two modes, the one being transmitted to the source 1 whereas the other is addressed to the receiver 3. The receiver 3 therefore furnishes a signal which is a function of the state of interference of the two waves and therefore of their phase shift. The electrical signal produced by the receiver 3 is addressed to the processing system 8 which, on the one hand, ensures the extracting of the parameter P for any use which is judged to be useful, and on the other hand, produces a signal at the electronic means 9 so as to control the phase modulator 4.

The signal processing carried out by the processing system 8 is of that type usually used in these devices. It comprises the formulating of a bias modulating signal allowing linearisation of the dependence between the signal received by the receiver 3 and the zero neighbourhood phase shift between the counter-propagating waves, a negative feedback signal maintaining this zero neighbourhood phase shift, by applying for example a serrodyne modulation.

Figure 3:
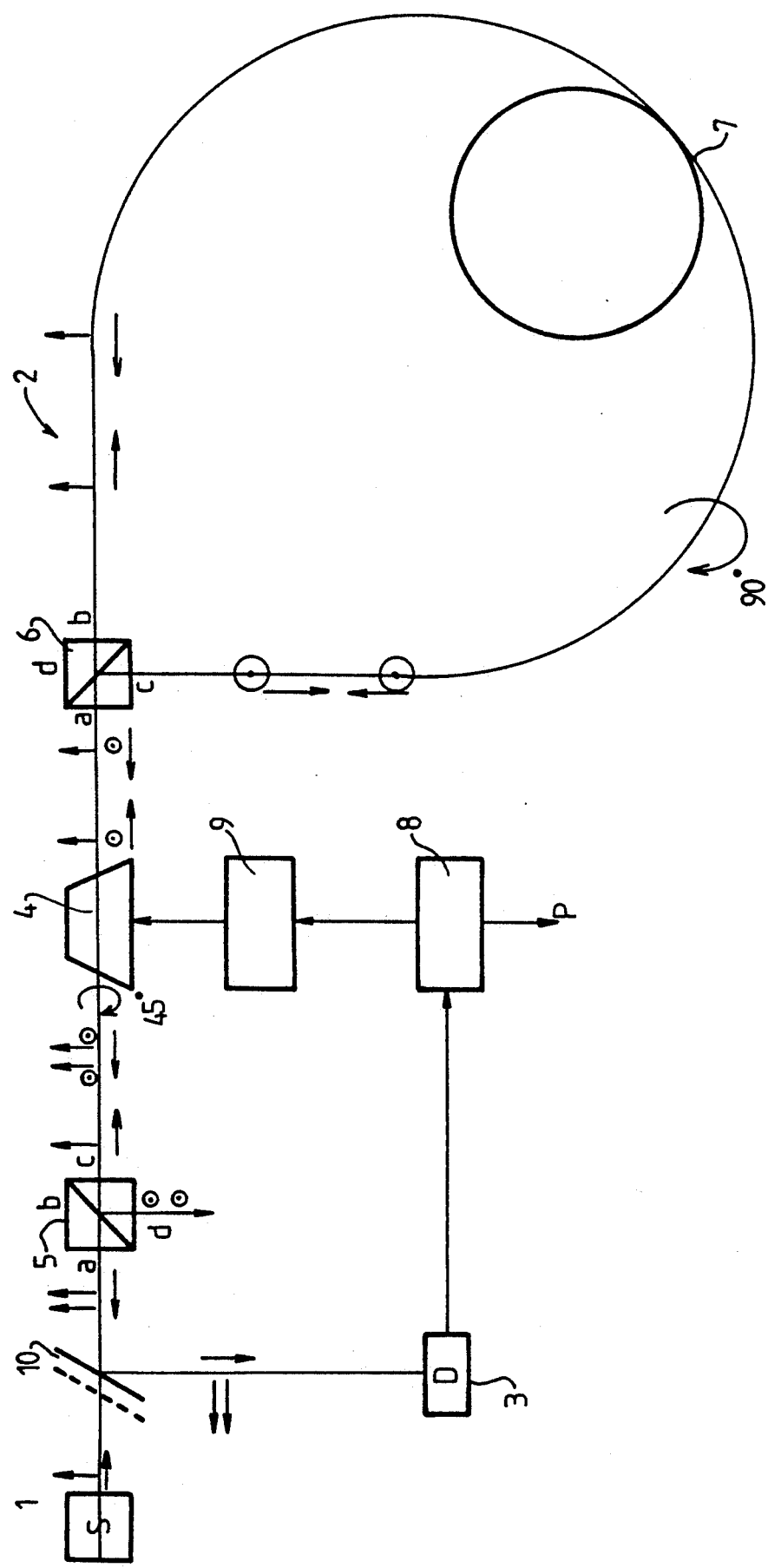
FIG. 3 is a diagram representing the device of the invention in a second embodiment.

In a second embodiment represented in FIG. 3, a semi-transparent plate 10 is interposed between the source 1 and the splitter 5, allowing the interference signal reemerging through the gate 5a to be oriented onto the receiver 3. This semi-transparent plate 10 can be replaced by an all-fibre 3 dB coupler. The waves exiting through the gate 5d of the splitter are not exploited in this case. The polarisation splitter 5 can then be replaced by a polariser.

In this second embodiment, as in the first, described above with reference to FIG. 1, one and the same component produces the splitting of the counter-propagating waves and then their combining after their circulation in the coil; thus the paths traversed by each of the two waves are identical and the only non-reciprocal effects are those produced in the coil.

We claim:

1. A fiber optic measuring device in which variation in a measured parameter engenders a phase difference between two waves, the fiber optic measuring device comprising:
   a) a light source with a small coherence length;
   b) a SAGNAC ring interferometer in which propagate two counter-propagating waves separated by a phase difference, the interferometer including a polarization-conserving birefringent fiber with first and second ends having respective principal birefringence axes;
   c) a detector, responsive to the SAGNAC ring interferometer;
   d) electronic means, responsive to the detector, and having a processing system for furnishing a signal that is a function of the measured parameter;
   e) a polarization splitter having first and second gates, the polarization splitter for spatially splitting the two polarized waves propagating in the SAGNAC ring interferometer, the first and second ends of the polarization-conserving fiber being respectively connected to the first and second gates of the polarization splitter, the axes of each end respectively coinciding with those of the first and second gates so as to couple, at each end, light in the same mode of polarization from the birefringent fiber;
   f) a birefringence modulator, disposed between the light source and the polarization splitter, for modulating the phase difference separating the counter-propagating waves, the birefringence modulator being actuated by the electronic means so that the birefringence modulator receives a bias modulation signal and a negative feedback signal;
   g) a birefringent component, disposed before the polarization splitter, and introducing a constant path difference greater than the coherence length of the source between the two polarized waves; and
   h) a polarizing element, disposed between the source and the polarization splitter, the polarizing element oriented so that light from the source is distributed over the modes of the polarization of the polarization splitter.

2. The fiber optic measuring device of claim 1, wherein:
   the polarization splitter includes a polarizing cube.

3. The fiber optic measuring device of claim 1, wherein:
   the polarization splitter includes a Wollaston prism.

4. The fiber optic measuring device of claim 1, wherein:
   the polarization splitter includes an all-fiber polarization splitter.

5. The fiber optic measuring device of claim 1, wherein:
   the light source includes a wide-spectrum superluminescent diode.

6. The fiber optic measuring device of claim 1, wherein:
   the polarizing element is an all-fiber component.

7. The fiber optic measuring device of claim 1, wherein:
   the detector is located so as to receive, through a gate of the polarizing element, light flux exiting the interferometer.

8. The fiber optic measuring device of claim 1, wherein:
   the fiber optic measuring device further comprises a beam splitter, disposed between the source and the polarizing element; and
   the detector is located so as to receive, through a gate of the beam splitter, flux exiting the interferometer.

9. The fiber optic measuring device of claim 1, wherein:
   the polarization conserving fiber is a stress birefringence fiber.

10. The fiber optic measuring device of claim 1, wherein:
    the birefringence modulator is an integrated optical component.

11. The fiber optic measuring device of claim 1, wherein:
    the polarizing element is a polarizer.

12. A rate tyro including the fiber optic measuring device of claim 1, wherein:
    the measured parameter is a speed of rotation of the SAGNAC ring interferometer about an axis of a coil associated with the SAGNAC ring interferometer.

13. A fiber optic measuring device in which variation in a measured parameter engenders a phase difference between two waves, the fiber optic measuring device comprising:
    a) a light source with a small coherence length;
    b) a SAGNAC ring interferometer in which propagate two counter-propagating waves separated by a phase difference, the interferometer including a polarization-conserving birefringent fiber with first and second ends having respective principal birefringence axes;
    c) a detector, responsive to the SAGNAC ring interferometer;
    d) electronic means, responsive to the detector, and having a processing system for furnishing a signal that is a function of the measured parameter;
    e) a polarization splitter having first and second gates, the polarization splitter for spatially splitting the two polarized waves propagating in the SAGNAC ring interferometer, the first and second ends of the polarization-conserving fiber being respectively connected to the first and second gates of the polarization splitter, the axes of each end respectively coinciding with those of the first and second gates so as to couple, at each end, light in the same mode of polarization from the birefringent fiber;

f) a birefringence modulator, disposed between the light source and the polarization splitter, for modulating the phase difference separating the counter-propagating waves, the birefringence modulator being actuated by the electronic means so that the birefringence modulator receives a bias modulation signal and a negative feedback signal;

g) a birefringent component, disposed before the polarization splitter, and introducing a path difference greater than the coherence length of the source between the two polarized waves;

h) a polarizing element, disposed between the source and the polarization splitter, the polarizing element oriented so that light from the source is distributed over the two modes of the polarization of the polarization splitter; and i) a beam splitter, disposed between the source and the polarizing element; wherein:

the polarization splitter includes a polarizing cube;

the light source includes a wide-spectrum superluminescent diode;

the polarizing element is an all-fiber component;

the detector is located so as to receive, through a gate of the polarizing element, light flux exiting the interferometer;

the detector is located so as to receive, through a gate of the beam splitter, light flux exiting the interferometer;

the polarization conserving fiber is a stress birefringence fiber; and the birefringence modulator is an integrated optical component.

* * * * *